United States Patent
Terao et al.

(10) Patent No.: US 8,009,063 B2
(45) Date of Patent: Aug. 30, 2011

(54) AUDIO SYSTEM AND NAVIGATION DEVICE

(75) Inventors: Iichiro Terao, Kariya (JP); Makoto Tanaka, Anjo (JP)

(73) Assignee: DENSO CORPORATION, Kariya (JP)

( * ) Notice: Subject to any disclaimer, the term of this patent is extended or adjusted under 35 U.S.C. 154(b) by 308 days.

(21) Appl. No.: 12/232,910

(22) Filed: Sep. 25, 2008

(65) Prior Publication Data

US 2009/0085776 A1 Apr. 2, 2009

(30) Foreign Application Priority Data

Sep. 27, 2007 (JP) .................................. 2007-252265

(51) Int. Cl.
*G08G 1/123* (2006.01)
(52) U.S. Cl. ................ 340/995.19; 340/988; 340/995.1; 360/69; 360/71; 701/201; 701/209
(58) Field of Classification Search .................. 340/988, 340/995.19–995.21, 995.1, 995.18, 996; 701/201, 209, 208, 211; 700/94; 360/69, 360/71
See application file for complete search history.

(56) References Cited

U.S. PATENT DOCUMENTS

| 6,055,478 | A * | 4/2000 | Heron ........................... 701/213 |
| 7,171,305 | B2 | 1/2007 | Minato et al. |
| 7,584,025 | B2 * | 9/2009 | Tanaka .............................. 701/1 |
| 7,698,057 | B2 * | 4/2010 | Kobayashi et al. ........... 701/200 |
| 2004/0267446 | A1 * | 12/2004 | Minato et al. ................. 701/209 |

FOREIGN PATENT DOCUMENTS

| JP | A-H9-258757 | 10/1997 |
| WO | WO 2007/010644 | 1/2007 |

OTHER PUBLICATIONS

First Office Action dated on Mar. 29, 2010 issued from the Chinese Patent Office in the corresponding Chinese patent application No. 200810165832.3 (with English translation).
Office Action issued on Apr. 13, 2011 issued in the Corresponding Japanese Patent Application No. 2007-252265.

* cited by examiner

*Primary Examiner* — Brent Swarthout
(74) *Attorney, Agent, or Firm* — Posz Law Group, PLC

(57) ABSTRACT

An audio system for a vehicle includes: a hard disk drive for storing an audio data; an output element for converting the audio data to an electric signal and for outputting the electric signal to a reproducer; a memory; a position determination element for determining whether the vehicle is disposed in a predetermined area; an output data specification element for specifying the audio data outputting from the output element when the vehicle is disposed in the predetermined area; and a memorizing data control element for storing the specified audio data as a transfer data in the memory. The output element converts the transfer data and outputs the converted transfer data to the reproducer.

10 Claims, 3 Drawing Sheets

AUDIO SYSTEM AND NAVIGATION DEVICE

CROSS REFERENCE TO RELATED APPLICATION

This application is based on Japanese Patent Application No. 2007-252265 filed on Sep. 27, 2007, the disclosure of which is incorporated herein by reference.

FIELD OF THE INVENTION

The present invention relates to an audio system and a navigation device.

BACKGROUND OF THE INVENTION

An in-vehicle navigation device for displaying a map around a current position of a vehicle, for calculating an optimum route to a destination and for guiding the route based on a map data includes a hard disk drive (i.e., HDD). The HDD as a memory stores the map data and the like.

The HDD is a memory device for reading and writing a data in a disk by using a magnetic head. The disk is a memory medium, on which magnetic material is applied. When the HDD functions, the magnetic head floats from the disk by a small clearance between the head and the disk with air pressure generated by rotation of the disk because of air viscosity. The magnetic head is disposed over the disk.

Accordingly, when the HDD functions under a condition where atmospheric pressure around the vehicle is very low, the air pressure for floating the magnetic head is reduced. Thus, the clearance between the head and the disk may not be sufficient. As a result, the head may collide with the disk, so that the disk is damaged.

Thus, when the in-vehicle navigation device includes the HDD, a certain countermeasure technique is required for protecting the HDD from being damaged in a case where the device may be used at a high altitude place having an altitude equal to or larger than a predetermined altitude, at which the function of the HDD is guaranteed. For example, the predetermined altitude is 3000 meters high, 4000 meters high or 5000 meters high.

When the vehicle reaches the predetermined altitude, for example, 3000 meters high, a part of the map data stored in the HDD is transferred to and stored in an external memory. Then, the HDD stops functioning. Thus, while the vehicle drives in a high altitude area, the navigation device guides the route based on the map data stored in the external memory. This is disclosed in, for example, JP-A-2004-317385, which corresponds to U.S. Pat. No. 7,171,305. Therefore, the HDD stops operating when the vehicle is disposed in the high altitude area, so that the disk is prevented from being damaged although the navigation device continues to guide the route.

However, in an in-vehicle navigation device, the device has not only route guiding function but also other functions. If the data corresponding to the other functions is stored in the HDD, the other functions are not available when the vehicle is disposed in the high altitude area.

For example, the navigation device may rip a song in a compact disk (i.e., CD) on the HDD, and/or download information from the Internet so that audio data is stored in the HDD. Thus, the navigation device plays the song and/or the audio data.

The above navigation device cannot play the audio data and/or the song stored in the HDD when the HDD stops functioning in a case where the vehicle is disposed in the high altitude area.

In this case, even if the audio data is transferred to the external memory, and the HDD continues to output the audio data because the device plays the audio data, the HDD stops functioning when the vehicle enters into the high altitude place. In this case, the playing of the song is interrupted. Thus, a user may feel discomfort. On the other hand, when the HDD stops functioning after the playing of the song ends, the disk may be damaged while the device plays the song since the HDD functions in the high altitude place, which is equal to or higher than the predetermined altitude.

Thus, it is required for an audio system to stop functioning the HDD without giving discomfort to the user even when the HDD stops functioning while the audio system plays the audio data in the HDD.

SUMMARY OF THE INVENTION

In view of the above-described problem, it is an object of the present disclosure to provide an audio system. It is another object of the present disclosure to provide a navigation device.

According to a first aspect of the present disclosure, an audio system for a vehicle includes: a hard disk drive for storing an audio data; an output element for converting the audio data to an electric signal and for outputting the electric signal to a reproducer; a memory for storing a data; a position determination element for determining whether the vehicle is disposed in a predetermined area; an output data specification element for specifying the audio data outputting from the output element to the reproducer when the position determination element determines that the vehicle is disposed in the predetermined area; and a memorizing data control element for storing the specified audio data as a transfer data in the memory. The output element converts the transfer data and outputs the converted transfer data to the reproducer when the position determination element determines that the vehicle is disposed in the predetermined area.

In the above system, even when the HDD stops operating, the playing song continues to be played. Thus, the user does not feel discomfort.

According to a second aspect of the present disclosure, a navigation device for a vehicle includes: a hard disk drive for storing an audio data; a speaker for reproducing the audio data; a controller for converting the audio data to an electric signal and for outputting the electric signal to the speaker; a volatile memory; and a position detector for detecting a current position of the vehicle. The controller determines whether the vehicle is disposed in a predetermined area based on the current position of the vehicle. The predetermined area has an altitude equal to or higher than a predetermined altitude. The controller specifies the audio data outputting from the controller to the speaker when the controller determines that the vehicle is disposed in the predetermined area. The controller stores the specified audio data as a transfer data in the volatile memory. The controller converts the transfer data and outputs the converted transfer data to the speaker when the controller determines that the vehicle is disposed in the predetermined area. The controller stops operating the hard disk drive when the controller determines that the vehicle is disposed in the predetermined area.

In the above device, even when the HDD stops operating, the audio data continues to be output. Thus, the user does not feel discomfort.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
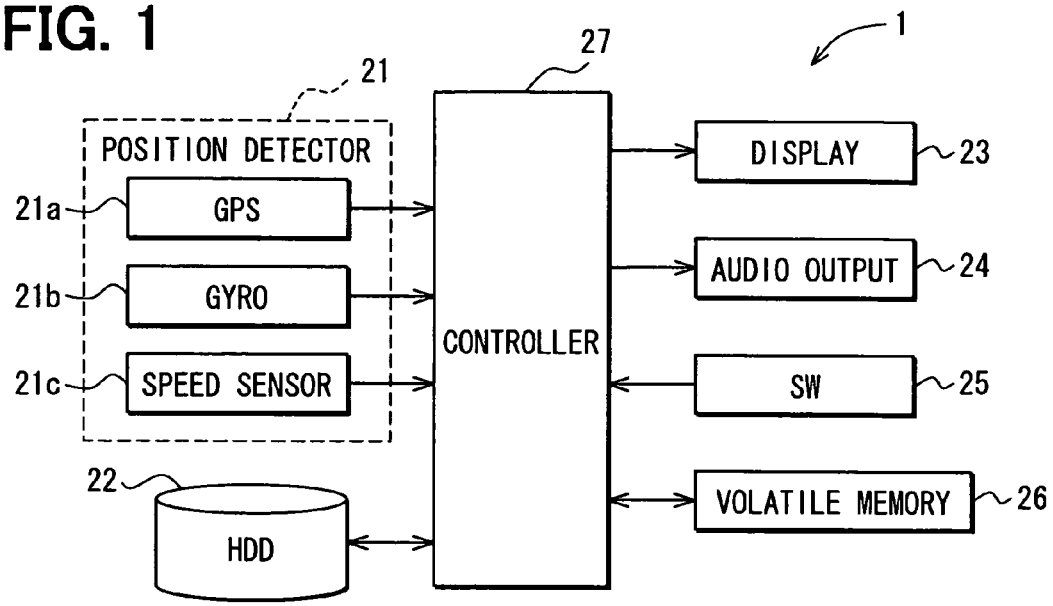
FIG. 1 is a block diagram showing an in-vehicle navigation device.

An in-vehicle navigation device 1 has an audio data playing function. As shown in FIG. 1, the device 1 includes a position detection element 21 for detecting a current position of a vehicle, a hard disk drive 22, a display 23 for displaying various images such as a map image, an audio output element 24 for outputting sound such as audio played by an audio element, multiple switches 25 for inputting various instructions operated by an user, a volatile memory 26 and a controller 27.

The position detection element 21 receives GPS information from a GPS artificial satellite via a GPS antenna. The element 21 includes a GPS receiver 21a for detecting the current position of the vehicle, a gyroscope 21b for outputting a detection signal corresponding to an angular speed of rotation applied to the vehicle, and a speed sensor 21c for outputting a detection signal corresponding to a speed of the vehicle. Each of the receiver 21a, the gyroscope 21b and the sensor 21c has a detection error having different characteristics. Therefore, the receiver 21a, the gyroscope 21b and the sensor 21c are used in a mutually complementary manner.

The hard disk drive 22 includes a hard disk for storing information and a drive for reading and writing the information in the hard disk. The drive includes a magnetic head, a driving element and a controlling element. The hard disk and the drive are integrated into the hard disk drive 22. The hard disk has a memory area for storing data. Specifically, the hard disk has a program memory area for storing an application program to operating the navigation device 1, a map data memory area for storing a map data showing map information, an audio data memory area for storing audio data, and other memory areas for storing various data. The hard disk drive 22 stores the map data, which includes a road data and an image data for performing a navigation function, and further, a mesh data for determining an altitude of the vehicle at the current position.

The audio data is obtained by ripping a song stored in a CD and/or by downloading information from the Internet. The audio data is, for example, shrunk in an MC standard and/or a MP3 standard. When the audio data is played, i.e., reproduced, the extracted audio data is temporary stored in the volatile memory 26. Then, the extracted audio data is converted into an electric signal, so that the electric signal is input into the audio output element 24. Thus, a song or the like is reproduced.

Figure 2A:
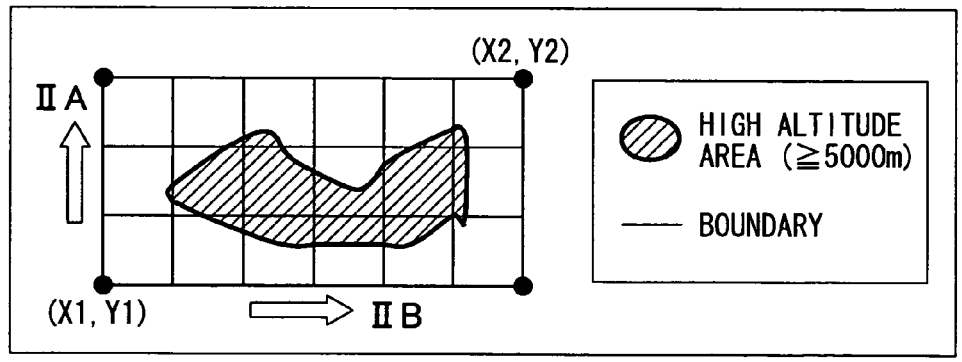
FIG. 2A is a plan view showing a two-dimensional coordinate map divided into multiple regions.
Figure 2B:
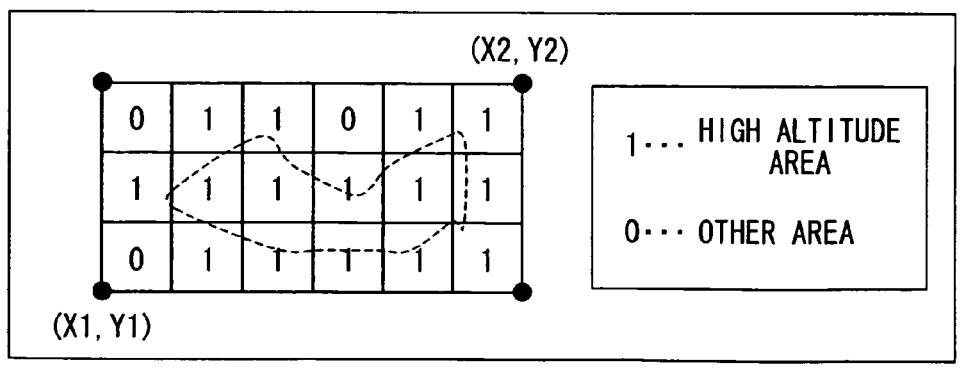
FIG. 2B is a plan view showing a mesh data in a region.

The mesh data is formed by the following manner. As shown in FIG. 2A, a coordinate plane of a map is divided into multiple regions along with a latitudinal direction IIA and a longitudinal direction IIB. As shown in FIG. 2B, each region corresponding to a respective mesh has a mesh data, which shows whether the region is a high altitude area or the other area. The mesh data "1" shows that the region is the high altitude area so that the region includes at least a point having an altitude equal to or larger than a predetermined altitude such as 5000 meters high. The mesh data "0" shows that the region does not include any high altitude area.

The display 23 is a color display having a screen such as a liquid crystal display. The display 23 displays various images in accordance with an image signal input from the controller 27. For example, when the vehicle runs, the display 23 functions as a navigation image display. Specifically, the display 23 displays the map based on the map data read out from the hard disk drive 22. Further, the display 23 displays a current position mark for showing the current position of the vehicle, which is detected by the position detection element 21, map data such as various identical names, various markers and various symbols of landmarks, a guiding route to a destination, which are overlapped over the map. When the audio output element 24 plays (i.e., reproduces) audio data, the display 23 displays information about the audio such as a name of a song and a playtime of the song, and/or information about a list of songs stored in the hard disk drive 22.

The audio output element 24 receives the electric signal based on the extracted audio data and outputs sound information corresponding to the electric signal. Further, the audio output element 24 outputs voice information for the navigation function such as route guide. The audio output element 24 is, for example, a speaker.

The switches 25 are integrated with the display 23. The switches include a touch switch disposed on the display screen of the display 23 and a mechanical key switch arranged around the display 23.

The volatile memory 26 is a memory medium for storing information. The memory 26 has an extracted data memory area for storing the extracted audio data temporary, and a transferred data memory area for storing the transferred data in a data transferring process.

The controller 27 is a microcomputer having a CPU, a ROM, a RAM, an I/O device and a bus line for connecting therebetween. The controller 27 controls the whole of the navigation device 1. The controller 27 executes an audio playing process, a navigation process, a high altitude area decision process and a data transferring process according to application programs and various data input from the hard disk dive 22 and the ROM.

In the audio playing process, the data in the CD that is inserted into the navigation device 1 and/or the extracted audio data are converted into the electric signal, so that the electric signal is input into the audio output element 24.

In the navigation process, for example, a map display process and a route guiding process are performed. In the map display process, the current position of the vehicle is calculated based on the detection signals from the position detection element 21. Further, the map around the vehicle at the current position is displayed on the display 23 based on the map data stored in the hard disk drive 22. In the route guiding process, based on the map data stored in the hard disk drive 22, an optimum route to the destination that is set by the user with operating the switches 25 is calculated. In view of the optimum route as a destination route and the current position, the navigation device 1 guides the optimum route to the destination. A method for calculating the optimum route automatically is, for example, a cost calculation method with using a Dijkstra method.

Various process executed by the controller 27 in the navigation device 1 will be explained as follows.

(1) High Altitude Decision Process

Figure 3:
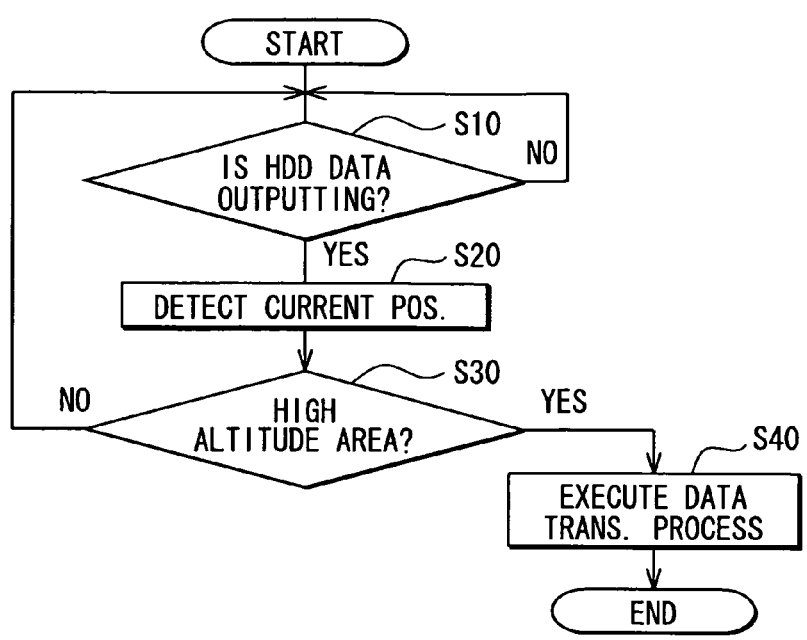
FIG. 3 is a flowchart showing a high altitude area decision process.

The high altitude area decision process executed by the controller 27 is shown in FIG. 3. The high altitude area decision process starts to be performed together with the audio playing process of the controller 27.

In the high altitude area decision process, in Step S10, the controller 27 decides whether a song is derived from the audio data stored in the HDD 22 if the song is outputting from the audio output element 24 at that moment. Specifically, in Step S10, the controller 27 decides whether the HDD outputs the audio data, i.e., a HDD data. When the song is not derived from the audio data in the HDD 22, i.e., when it is decided as "NO" in Step S10, Step S10 is repeated.

When the song is derived from the audio data in the HDD 22, i.e., when it is determined as "YES" in Step S10, it proceeds to Step S20. In Step S20, the current position of the vehicle is detected. Here, based on the output signal from the position detection element 21, the current position of the vehicle is detected.

Next, in Step S30, it is determined whether the vehicle is disposed in the high altitude area. Here, its is determined whether the coordinates of the current position of the vehicle detected in Step S20 is disposed in any one of meshes of the high altitude area. When it is determined that the vehicle is disposed in the high altitude area, i.e., when it is determined as "YES" in Step S30, it proceeds to Step S40. In Step S40, the data transferring process starts. Then, the high altitude area decision process ends.

When it is determined that the vehicle is not disposed in the high altitude area, i.e., when it is determined as "NO" in Step S30, it returns to Step 10.

(2) Data Transferring Process

Figure 4:
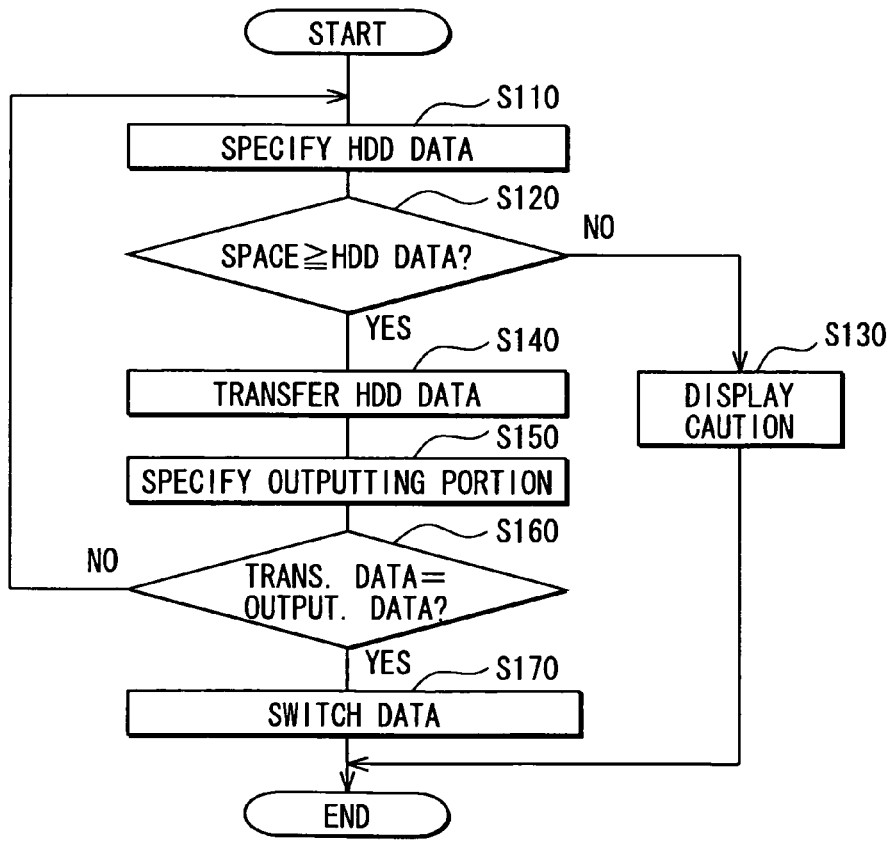
FIG. 4 is a flowchart showing a data transferring process.

The data transferring process executed by the controller 27 is shown in FIG. 4. The data transferring process starts in Step S40 of the high altitude area decision process.

In the data transferring process, in Step S110, the HDD data outputting from the audio output element 24 at that moment is specified among the HDD data stored in the HDD 22. Further, the data size of the specified HDD data is also checked.

Next, in Step S120, it is determined whether the amount of space in the transferred data memory area of the volatile memory 26 is equal to or larger than the data size of the specified HDD data.

When the amount of space is smaller than the data size, i.e., when it is determined as "NO" in Step S120, it proceeds to Step S130. In Step S130, the display 23 displays a message of caution of "audio play cannot continue." Then, the data transferring process ends.

When the amount of space is equal to or larger than the data size, i.e., when it is determined as "YES" in Step S120, it proceeds to Step S140. In Step S140, the volatile memory 26 stores the specified HDD data as transferred data.

Figure 5:
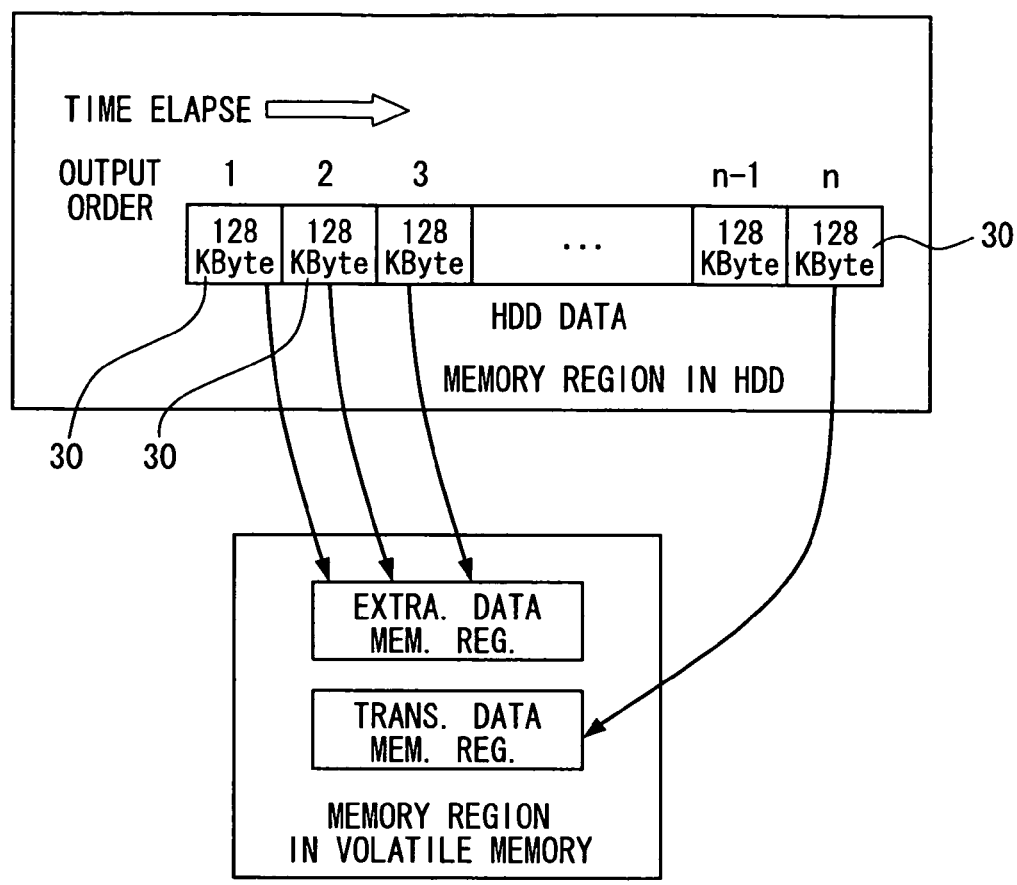
FIG. 5 is a chart showing a process for transferring audio data from HDD to a volatile memory.

Next, a portion of the HDD data outputting from the audio output element 24 at that moment is specified in Step S150. As shown in FIG. 5, the audio data is extracted to unit data 30 having 128 kByte in outputting time order. Each unit data 30 is stored in the volatile memory 26. Here, the outputting unit data 30 at that moment is specified among the unit data 30.

Next, in Step S160, it is determined whether the transferred data is the same as the outputting HDD data at that moment. When the transferred HDD data is not the same as the outputting HDD data, i.e., it is determined as "NO" in Step S160, that means the playing of the song corresponding to the HDD data ends while the HDD data is transferred. In this case, it returns to Step S110. When the transferred HDD data is the same as the outputting HDD data, i.e., it is determined as "YES" in Step S160, it proceeds to Step S170.

In Step S170, the data to be output from the audio output element 24 is switched from the HDD data to the transferred HDD data. Here, unit data next to the specified outputting unit data, which is specified in Step S150, is extracted. Then, the extracted data is output from the audio output element 24 next to the specified outputting unit data. When the data to be output is switched from the HDD data to the transferred HDD data, mute control is performed so that a ticking sound, i.e., a noise is reduced. After that, the transferred HDD data is output so that the data continues to be output.

In the above navigation device 1, even when the vehicle enters into the high altitude area and the hard disk drive 22 stops operation, the playing of the song is not interrupted. Thus, the hard disk drive 22 stops operation without user's discomfort.

MODIFICATIONS

In the above embodiment, the data transferring process starts when the vehicle is disposed in the high altitude area. Alternatively, the data transferring process starts when it is determined that it is necessary to stop operating the hard disk drive.

For example, when there is no road around the vehicle, the road on which the vehicle can run normally, and the vehicle enters into an area, in which the vehicle may vibrate or roll largely while the vehicle runs in the area, it is determined that it is necessary to stop operating the hard disk drive, so that the data transferring process starts. In this case, when the hard disk drive 22 stops operation in order to protect the hard disk drive from being damaged, the playing of the song continues. Here, the determination whether the vehicle enters into the area is performed by verifying the current position of the vehicle with the map data. Alternatively, the determination may be performed by comparing the amplitude of vibration of the vehicle and the duration time of the vibration with a predetermined amplitude and a predetermined time. Here, the amplitude of vibration of the vehicle is detected by a sensor, which is mounted on the vehicle so that the sensor detects the vibration of the vehicle.

In the above embodiment, the volatile memory 26 stores the HDD data as the transferred data. Alternatively, the volatile memory 26 may store an extracted HDD data as the transferred data.

In the above embodiment, the HDD data corresponding to the outputting song is stored in the volatile memory 26. Alternatively, the HDD data corresponding to not only the outputting song but also other songs to be output may be stored in the volatile memory 26.

In the above embodiment, only the HDD data is stored in the volatile memory 26. Alternatively, an image data displaying on the display 23 while the song is output from the audio output element 24 may be stored in the volatile memory 26. In this case, even when the hard disk drive stops operating, the display 23 continues to display the image. Thus, the user does not feel discomfort.

The controller 27 may provide an output element, a position determination element, an outputting data specification element, memorizing data control element, and an output portion specification element. The volatile memory 26 may provide a memory. The audio output element 24 and/or the display 23 may provide a reproducer.

The above disclosure has the following aspects.

According to a first aspect of the present disclosure, an audio system for a vehicle includes: a hard disk drive for storing an audio data; an output element for converting the audio data to an electric signal and for outputting the electric signal to a reproducer; a memory for storing a data; a position determination element for determining whether the vehicle is disposed in a predetermined area; an output data specification element for specifying the audio data outputting from the output element to the reproducer when the position determination element determines that the vehicle is disposed in the predetermined area; and a memorizing data control element for storing the specified audio data as a transfer data in the memory. The output element converts the transfer data and outputs the converted transfer data to the reproducer when the position determination element determines that the vehicle is disposed in the predetermined area.

Here, the reproducer is, for example, a speaker or a head phone, which converts the electric signal to mechanical vibration and outputs audible sound. In the above audio system, when the vehicle enters into the predetermined area, the data to be output to the reproducer is switched from the audio data stored in the HDD to the transfer data stored in the memory. Accordingly, even when the HDD stops operating, the playing song continues to be played. Thus, the user does not feel discomfort. The audio data may be uncompressed data. Alternatively, the audio data may be compressed data such as AAC data and a MP3 data. When the audio data is the compressed data, the transfer data may be the same type data of the audio data as the compressed data. Alternatively, the transfer data may be the extracted audio data.

The song may be played from the beginning based on the transfer data. Alternatively, the song may be played continuously. Specifically, even when the data to be output to the reproducer is switched from the audio data stored in the HDD to the transfer data stored in the memory, the song is played from a portion, which has been played before the data is switched.

Alternatively, the predetermined area may have an altitude equal to or higher than a predetermined altitude.

Alternatively, the audio system may further include: an output portion specification element for specifying an outputting portion of the audio data outputting from the output element to the reproducer. The memorizing data control element stores the specified outputting portion of the audio data as the transfer data in the memory, and the output element converts the transfer data and outputs the converted transfer data to the reproducer when the position determination element determines that the vehicle is disposed in the predetermined area.

According to a second aspect of the present disclosure, a navigation device for a vehicle includes: a hard disk drive for storing an audio data; a speaker for reproducing the audio data; a controller for converting the audio data to an electric signal and for outputting the electric signal to the speaker; a volatile memory; and a position detector for detecting a current position of the vehicle. The controller determines whether the vehicle is disposed in a predetermined area based on the current position of the vehicle. The predetermined area has an altitude equal to or higher than a predetermined altitude. The controller specifies the audio data outputting from the controller to the speaker when the controller determines that the vehicle is disposed in the predetermined area. The controller stores the specified audio data as a transfer data in the volatile memory. The controller converts the transfer data and outputs the converted transfer data to the speaker when the controller determines that the vehicle is disposed in the predetermined area. The controller stops operating the hard disk drive when the controller determines that the vehicle is disposed in the predetermined area.

In the above device, even when the HDD stops operating, the audio data continues to be output. Thus, the user does not feel discomfort.

Alternatively, the navigation device may further include: a display for displaying information to navigate a route to a destination. The audio data provides voice guidance for navigating the route and music for entertaining an user.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An audio system for a vehicle comprising:
a hard disk drive for storing an audio data;
an output element for converting the audio data to an electric signal and for outputting the electric signal to a reproducer;
a memory for storing a data;
a position determination element for determining whether the vehicle is disposed in a predetermined area;
an output data specification element for specifying the audio data outputting from the output element to the reproducer when the position determination element determines that the vehicle is disposed in the predetermined area; and
a memorizing data control element for storing the specified audio data as a transfer data in the memory,
wherein the output element converts the transfer data and outputs the converted transfer data to the reproducer when the position determination element determines that the vehicle is disposed in the predetermined area,
wherein the output element switches from outputting of the electric signal to outputting of the converted transfer data when the position determination element determines that the vehicle is disposed in the predetermined area, and
wherein the output element automatically without user intervention performs mute control for reducing noise when the output element switches from the outputting of the electric signal to the outputting of the converted transfer data.

2. The audio system according to claim 1,
the predetermined area has an altitude equal to or higher than a predetermined altitude.

3. The audio system according to claim 1, further comprising:
an output portion specification element for specifying an outputting portion of the audio data outputting from the output element to the reproducer,
wherein the memorizing data control element stores the specified outputting portion of the audio data as the transfer data in the memory, and
wherein the output element converts the transfer data and outputs the converted transfer data to the reproducer when the position determination element determines that the vehicle is disposed in the predetermined area.

4. A navigation device for a vehicle comprising:
a hard disk drive for storing an audio data;
a speaker for reproducing the audio data;

a controller for converting the audio data to an electric signal and for outputting the electric signal to the speaker;

a volatile memory; and a position detector for detecting a current position of the vehicle, wherein the controller determines whether the vehicle is disposed in a predetermined area based on the current position of the vehicle, wherein the predetermined area has an altitude equal to or higher than a predetermined altitude, wherein the controller specifies the audio data outputting from the controller to the speaker when the controller determines that the vehicle is disposed in the predetermined area, wherein the controller stores the specified audio data as a transfer data in the volatile memory, wherein the controller converts the transfer data and outputs the converted transfer data to the speaker when the controller determines that the vehicle is disposed in the predetermined area, wherein the controller stops operating the hard disk drive when the controller determines that the vehicle is disposed in the predetermined area, wherein the controller switches from outputting of the electric signal to outputting of the converted transfer data when the controller determines that the vehicle is disposed in the predetermined area, and wherein the controller automatically without user intervention performs mute control for reducing noise when the controller switches from the outputting of the electric signal to the outputting of the converted transfer data.

5. The navigation device according to claim 4, further comprising:

a display for displaying information to navigate a route to a destination, wherein the audio data provides voice guidance for navigating the route and music for entertaining an user, wherein the controller further outputs the electric signal to the display, and wherein the controller further outputs the converted transfer data to the display when the controller determines that the vehicle is disposed in the predetermined area.

6. The audio system of claim 1, wherein the memorizing data control element is a volatile memory.

7. The audio system of claim 1, wherein the converted transfer data continues to be output by the output element after the output element switches from the outputting of the electric signal to the outputting of the converted transfer data.

8. The audio system of claim 1, wherein the transfer data stored in the memory corresponds to one or more entire songs to be output.

9. The navigation device of claim 4, wherein the converted transfer data continues to be output by the controller after the controller switches from the outputting of the electric signal to the outputting of the converted transfer data.

10. The navigation device of claim 4, wherein the transfer data stored in the volatile memory corresponds to one or more entire songs to be output.

* * * * *